United States Patent
Zhao et al.

(10) Patent No.: US 12,108,428 B2
(45) Date of Patent: Oct. 1, 2024

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/171,681

(22) Filed: Feb. 9, 2021

(65) Prior Publication Data
US 2021/0168817 A1 Jun. 3, 2021

Related U.S. Application Data (63) Continuation of application No. PCT/CN2018/101197, filed on Aug. 17, 2018.

(51) Int. Cl.
*H04W 72/54* (2023.01)
*H04W 56/00* (2009.01)

(52) U.S. Cl.
CPC .......... *H04W 72/54* (2023.01); *H04W 56/00* (2013.01)

(58) Field of Classification Search
CPC .............................. H04W 72/08; H04W 56/00
See application file for complete search history.

(56) References Cited

U.S. PATENT DOCUMENTS

| | | | |
|---|---|---|---|
| 11,206,628 B2 * | 12/2021 | Zhang | H04W 56/00 |
| 2016/0174174 A1 | 6/2016 | Chae et al. | |
| 2017/0048038 A1 * | 2/2017 | Seo | H04L 5/0082 |
| 2017/0188391 A1 | 6/2017 | Rajagopal et al. | |
| 2017/0201968 A1 | 7/2017 | Nam et al. | |
| 2017/0223743 A1 | 8/2017 | Lin et al. | |
| 2017/0353936 A1 | 12/2017 | Zhang et al. | |
| 2018/0220481 A1 | 8/2018 | Seo et al. | |
| 2019/0045526 A1 | 2/2019 | Lee et al. | |

(Continued)

FOREIGN PATENT DOCUMENTS

| | | |
|---|---|---|
| CN | 106211027 A | 12/2016 |
| CN | 107040354 A | 8/2017 |

(Continued)

OTHER PUBLICATIONS

3GPP TSG RAN WG1 Meeting #94 R1-1808876, Gothenburg, Sweden, Aug. 20-24, 2018, Source:OPPO, Title: Discussion of physical layer structure and procedure for NR-V2X, Agenda Item:7.2.4.1.2, Document for: Discussion and Decision.

(Continued)

*Primary Examiner* — Saad A. Waqas
(74) *Attorney, Agent, or Firm* — Ladas & Parry LLP (57) ABSTRACT

A data transmission method, a terminal device, a network device, a chip, a computer-readable storage medium, a computer program product and a computer program are provided. The method includes that: a basic parameter set adopted for a first sidelink (SL) channel is determined; and data transmission is performed on the first SL channel based on the basic parameter set.

6 Claims, 3 Drawing Sheets

(56) References Cited

U.S. PATENT DOCUMENTS

| | | | |
|---|---|---|---|
| 2019/0150149 A1 | 5/2019 | Tang | |
| 2020/0059337 A1* | 2/2020 | Yamada | H04L 27/2613 |
| 2020/0245281 A1 | 7/2020 | Chae et al. | |
| 2020/0296692 A1* | 9/2020 | Lee | H04W 52/383 |
| 2020/0322924 A1* | 10/2020 | Kim | H04W 72/02 |
| 2021/0168817 A1 | 6/2021 | Zhao et al. | |
| 2021/0336688 A1* | 10/2021 | Lee | H04W 4/40 |

FOREIGN PATENT DOCUMENTS

| | | | | |
|---|---|---|---|---|
| CN | 107371258 A | | 11/2017 | |
| CN | 107666681 A | | 2/2018 | |
| CN | 107733818 A | | 2/2018 | |
| CN | 107925495 A | | 4/2018 | |
| CN | 108023698 A | | 5/2018 | |
| CN | 108028730 A | | 5/2018 | |
| CN | 108282430 A | | 7/2018 | |
| CN | 114051703 A | * | 2/2022 | H04L 1/1671 |
| EP | 3409057 A2 | | 12/2018 | |
| EP | 3703436 A1 | | 9/2020 | |
| EP | 3823394 A1 | | 5/2021 | |
| EP | 3836675 A1 | | 6/2021 | |
| EP | 3843311 A1 | | 6/2021 | |
| WO | WO-2015019860 A1 | * | 2/2015 | H04W 76/14 |
| WO | WO-2016021580 A1 | * | 2/2016 | H04L 1/1812 |
| WO | 2017222351 A1 | | 12/2017 | |
| WO | 2018014306 A1 | | 1/2018 | |
| WO | 2018185093 A1 | | 10/2018 | |

OTHER PUBLICATIONS

3GPP TSG RAN WG1 Meeting #94 R1-1808295, Gothenburg, Sweden, Aug. 20-24, 2018, Source: Fujitsu, Title: Considerations on sidelink physical layer structures, Agenda Item: 7 .2.4.1.2, Document for: Discussion/Decision.

3GPP TSG-RAN WG2 NR Adhoc #2 R2-1706588, Qingdao, China, Jun. 27-29, 2017, Agenda item: 10.3.1.7, source: Nokia, Alcatel-Lucent Shanghai Bell, Title: Details on LCP, WID/SID: NR_newRAT-Core—Release 15, Document for: Discussion and Decision.

Supplementary European Search Report in the European application No. 18930509.7, mailed on May 31, 2021.

English translation of the Written Opinion of the International Search Authority in the international application No. PCT/CN2018/101197, mailed on May 17, 2019.

First Office Action of the European application No. 18930509.7, issued on Dec. 17, 2021.

First Office Action of the Indian application No. 202117010636, issued on Feb. 3, 2022.

Samsung. "Remaining details on Dmrs", 3GPP TSG RAN WGI #86, R1-166713, Aug. 26, 2016 (Aug. 26, 2016), sections 1 and 2.

International Search Report in the international application No. PCT/CN2018/101197, mailed on May 17, 2019.

Second Office Action of the European application No. 18930509.7, issued on Jun. 13, 2022.

First Office Action of the Chinese application No. 202110407346.3, issued on Aug. 10, 2022.

Huawei et al., "Summary of AI: 7.2.4.3 Uu-based sidelink resource allocation/configuration", 3GPP TSG RAN WG1 Meeting #94 R1-1809878, Gothenburg, Sweden, Aug. 20-24, 2018.

Nokia et al, "Initial View on Nr V2X Sidelink Physical Layer Structures and Procedures", 3GPP TSG RAN WG1 Meeting #94 R1-1809045, Gothenburg, Sweden, Aug. 20-24, 2018.

Intel Corporation, "Sidelink Synchronization for NR V2X Communication", 3GPP TSG RAN WG1 Meeting #94 R1-1808695, Gothenburg, Sweden, Aug. 20-24, 2018.

Sony, "Initial considerations on NR V2X resource allocation mechanism", 3GPP TSG RAN WG1 Meeting #94 R1-1808341, Goteborg, Sweden, Aug. 20-24, 2018.

Lenovo et al., "Synchronization mechanism", 3GPP TSG RAN WG1 Meeting #94bis R1-1810575, Chengdu, China, Oct. 8-12, 2018.

International Search Report in the international application No. PCT/CN2018/112483, mailed on Jul. 30, 2019.

Written Opinion of the International Search Authority in the international application No. PCT/CN2018/112483, mailed on Jul. 30, 2019.

Panasonic, "Discussion on physical layer structures and procedure(s) of NR sidelink", 3GPP TSG RAN WG1 Meeting #94bis R1-1810952, Chengdu, China, Oct. 8-12, 2018.

vivo, "NR sidelink synchronization mechanism", 3GPP TSG RAN WG1 Meeting #94bis R1-1810390, Chengdu, China, Oct. 8-12, 2018.

vivo, "NR sidelink resource allocation", 3GPP TSG RAN WG1 Meeting #94 R1-1808245, Gothenburg, Sweden, Aug. 20-24, 2018.

CATT, "Summary of Offline Discussion on NR V2X Synchronization", 3GPP TSG RAN1 Meeting #94bis R1-1812068, Chengdu, China, Oct. 8-12, 2018.

Spreadtrum Communications, "Discussion on NR Sidelink Synchronization Mechanisms", 3GPP TSG RAN WG1 Meeting #94bis R1-1811008, Chengdu, China, Oct. 8-12, 2018.

Supplementary European Search Report in the European application No. 18939078.4, mailed on Aug. 5, 2021.

First Office Action of the European application No. 18939078.4, issued on Apr. 14, 2022.

First Office Action of the Japanese application No. 2021-520918, issued on Jul. 15, 2022.

First Office Action of the Chinese application No. 202110462285.0, issued on Jan. 28, 2022.

Notice of Allowance of the Chinese application No. 202110462285.0, issued on Jun. 20, 2022.

Office Action of the Indian application No. 202117019466, issued on Feb. 14, 2022.

Second Office Action of the Chinese application No. 202110407346.3, issued on Oct. 28, 2022.

European Search Report in the European application No. 23156722.3, mailed on Mar. 27, 2023.

* cited by examiner

DATA TRANSMISSION METHOD, TERMINAL DEVICE AND NETWORK DEVICE

This application is a continuation of International Patent Application No. PCT/CN2018/101197 filed on Aug. 17, 2018, the content of which is incorporated hereby in its entirety.

TECHNICAL FIELD

The disclosure relates to the technical field of information processing, and particularly to a data transmission method, a terminal device, a network device, a chip, a computer-readable storage medium, a computer program product and a computer program.

BACKGROUND

A Vehicle-to-Everything (V2X) system belongs to a sidelink (SL) transmission technology based on Long Term Evolution (LTE)-Device to Device (D2D). In the 3rd Generation Partnership Project (3GPP) Release-14 (Rel-14), a V2X technology is standardized, and two transmission modes are defined: mode 3 and mode 4. In a 5th-Generation (5G) New Radio (NR) system, a flexible frame structure design is adopted, and multiple basic parameter sets are introduced. During system processing, how to transmit and receive data based on multiple basic parameter sets is a problem that needs to be solved.

SUMMARY

Embodiments of the disclosure provide a data transmission method, a terminal device, a network device, a chip, a computer-readable storage medium, a computer program product and a computer program.

A first aspect provides a data transmission method, which may be applied to a terminal device and include that:

a basic parameter set adopted for a first SL channel is determined; and data transmission is performed on the first SL channel based on the basic parameter set.

A second aspect provides a data transmission method, which may be applied to a network device and include that:

the network device determines configuration information, the configuration information being configured for a terminal device to determine a basic parameter set adopted for a first SL channel; and the network device sends the configuration information to the terminal device.

A third aspect provides a terminal device, which may include a first processing unit and a first communication unit.

The first processing unit may be configured to determine a basic parameter set adopted for a first SL channel.

The first communication unit may be configured to perform data transmission on the first SL channel based on the basic parameter set.

A fourth aspect provides a network device, which may include a second processing unit and a second communication unit.

The second processing unit may be configured to determine configuration information, the configuration information being configured for a terminal device to determine a basic parameter set adopted for a first SL channel.

The second communication unit may be configured to send the configuration information to the terminal device.

A fifth aspect provides a terminal device, which may include a processor and a memory. The memory may be configured to store a computer program, and the processor may be configured to call and run the computer program stored in the memory to execute the method in the first aspect or each implementation mode thereof.

A sixth aspect provides a network device, which may include a processor and a memory. The memory may be configured to store a computer program, and the processor may be configured to call and run the computer program stored in the memory to execute the method in the second aspect or each implementation mode thereof.

A seventh aspect provides a chip, which may be configured to implement the method in any aspect of the first aspect to the second aspect or each implementation mode thereof.

Specifically, the chip may include a processor, configured to call and run a computer program in a memory to cause a device installed with the chip to execute the method in any aspect of the first aspect to the second aspect or each implementation mode thereof.

An eighth aspect provides a computer-readable storage medium, which may be configured to store a computer program, the computer program causing a computer to execute the method in any aspect of the first aspect to the second aspect or each implementation mode thereof.

A ninth aspect provides a computer program product, which may include a computer program instruction, the computer program instruction causing a computer to execute the method in any aspect of the first aspect to the second aspect or each implementation mode thereof.

A tenth aspect provides a computer program, which may run in a computer to cause the computer to execute the method in any aspect of the first aspect to the second aspect or each implementation mode thereof.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the application without creative work shall fall within the scope of protection of the disclosure.

Figure 1:
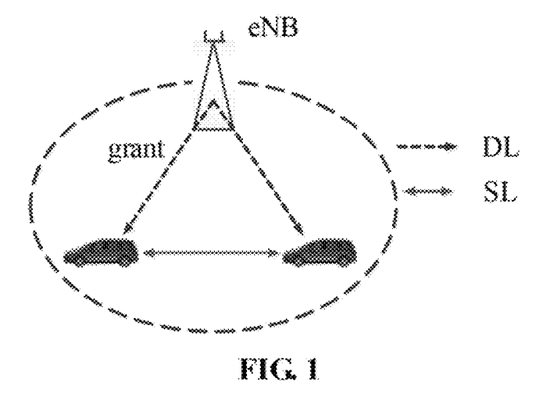
FIG. 1 is a first schematic diagram of an architecture of a communication system according to an embodiment of the disclosure.
Figure 2:
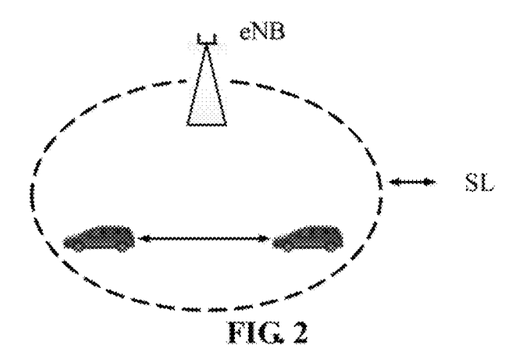
FIG. 2 is a second schematic diagram of an architecture of a communication system according to an embodiment of the disclosure.

The solutions provided in the embodiments of the disclosure may be applied to a V2X system as shown in FIGS. 1 and 2. The V2X system belongs to an SL transmission technology based on LTE-D2D and has higher spectrum efficiency and a lower transmission delay. In 3GPP Rel-14, a V2X technology is standardized, and two transmission modes are defined: mode 3 and mode 4. In the mode 3, as shown in FIG. 1, a transmission resource of a terminal device. i.e., a vehicle terminal, may be allocated by a base station, and the vehicle terminal may send data on an SL based on the resource allocated by the base station. The base station may allocate a resource for single transmission to the terminal or may also allocate a resource for semi-persistent transmission to the terminal. In the mode 4, as shown in FIG. 2, the vehicle terminal adopts a transmission manner combining sensing and reservation. The vehicle terminal may acquire an available transmission resource set from a resource pool in a sensing manner, and the terminal may randomly select a resource from the transmission resource set for data transmission.

It is to be understood that terms "system" or "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Embodiment 1

Figure 3:
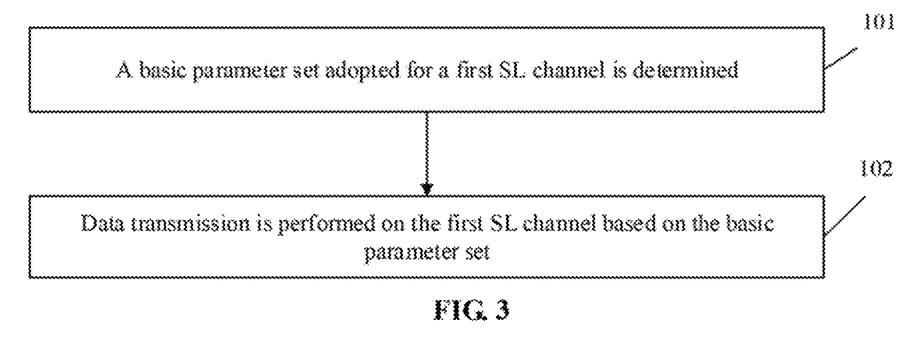
FIG. 3 is a first flowchart of a data transmission method according to an embodiment of the disclosure.

The embodiment of the disclosure provides a data transmission method, which is applied to a terminal device and, as shown in FIG. 3, includes the following operations.

In operation 101, a basic parameter set adopted for a first SL channel is determined.

In operation 102, data transmission is performed on the first SL channel based on the basic parameter set.

The terminal device may acquire and save at least one basic parameter set according to a pre-configuration or a configuration made by a network side.

The basic parameter set may include information such as a subcarrier spacing a Cyclic Prefix (CP) length and a type. For example, in 5G NR, supported subcarrier spacings may include 5 kHz, 30 kHz, 60 kHz, 120 kHz and the like, and supported CP types may include a normal CP and an extended CP.

Two conditions of corresponding relationship and indication information will be described below respectively.

A first condition: the basic parameter set adopted for the first SL channel is determined according to a corresponding relationship. Under this condition, the terminal device may select one basic parameter set from the at least one basic parameter set as the basic parameter set for the first SL channel according to at least one corresponding relationship that is configured by the network side or pre-configured. The least one corresponding relationship is specifically described below.

A First Scenario

When a resource in a first resource pool is used for the first SL channel, a first basic parameter set among the at least one basic parameter set is determined as the basic parameter set adopted for the first SL channel based on the first resource pool and a first corresponding relationship. The first corresponding relationship is a corresponding relationship between at least one resource pool and the at least one basic parameter set.

In this scenario, when the first resource pool is adopted for the first SL channel, the first basic parameter set corresponding to the first resource pool may be selected according to the first corresponding relationship.

For example, in V2X, one or more resource pools may be configured in a manner of configuration by the network side or pre-configuration, and each resource pool has a corresponding basic parameter set. For example, the subcarrier spacing 15 kHz and the normal CP are adopted for a resource pool 1, and the subcarrier spacing 60 kHz and the extended CP are adopted for a resource pool 2. It may be determined according to the first corresponding relationship that different resource pools may correspond to different basic parameter sets. The first corresponding relationship represents the corresponding relationship between a resource pool and the basic parameter set. When the resource in the first resource pool is adopted for the first SL channel, the basic parameter set of the resource pool may be determined according to the first corresponding relationship, namely the basic parameter set adopted for the first SL channel is determined.

The first corresponding relationship between the at least one resource pool and the at least one basic parameter set may be determined in the manner of configuration by the network side or pre-configuration.

In addition, the network side may also configure the basic parameter set of each resource pool through Radio Resource Control (RRC) signaling.

A Second Scenario

When the first SL channel is transmitted on a first carrier, the first basic parameter set among the at least one basic parameter set is determined as the basic parameter set adopted for the first SL channel based on the first carrier and a second corresponding relationship. The second corresponding relationship is a corresponding relationship between at least one carrier and the at least one basic parameter set.

In this scenario, when the first SL channel is transmitted on the first carrier, the first basic parameter set corresponding to the first carrier may be selected according to the second corresponding relationship.

In this scenario, multiple carriers may be supported. For example, in V2X of Rel-15, 8 carriers may be supported, and different basic parameter sets may be configured for the 8 carriers respectively.

For example, considering a terminal backwards compatible with Rel-14 or Rel-15, a basic parameter set including 15 kHz and the normal CP is adopted for a Rel-14 or Rel-15 carrier. Another basic parameter set may be adopted for another carrier.

It is to be pointed out that the above is only an example and a basic parameter set specifically adopted for a specific carrier may be determined in the manner of pre-configuration or configuration by the network side.

In addition, the second corresponding relationship that different carriers correspond to different basic parameter sets may be that different carrier frequency bands correspond to different basic parameter sets. For example, NR-V2X supports two carrier frequency bands, i.e., Frequency Range (FR) 1 and FR2. The second corresponding relationship may be that different basic parameter sets may be adopted in different carrier frequency bands. For example, the subcarrier spacing 30 kHz may be adopted in the FR1 such as 3.4 GHz, and the subcarrier spacing 120 kHz may be adopted in the FR2 such as 30 GHz.

In this scenario, basic parameter sets corresponding to different types may also be determined according to the carrier types.

Specifically, when the first carrier is a carrier configured to transmit uplink data, it may be determined based on the first carrier and the second corresponding relationship that a same basic parameter set as that for the uplink data is adopted for the first SL channel.

That is, the configured second corresponding relationship may also be that a basic parameter set corresponding to a first-type carrier is a basic parameter set the same as that for uplink data and that a basic parameter set corresponding to a second-type carrier is a basic parameter set the same as or different from that for the uplink data. The first-type carrier is a carrier configured to transmit the uplink data, and the second-type carrier is a dedicated carrier. For example, V2X may work on a dedicated carrier (5.9 GHz) or may also work on an uplink carrier. The subcarrier spacing 30 kHz may be adopted for uplink data transmitted on the uplink carrier. When V2X data is transmitted on the uplink carrier, the V2X data may be also transmitted by use of the same subcarrier spacing 30 kHz for the uplink data. When the V2X data is transmitted on the dedicated carrier, a basic parameter set that is pre-configured or configured by the network is adopted, and the basic parameter set may be the same as or different from the basic parameter set for the uplink data.

It is to be understood that the descriptions are made in the abovementioned embodiment with the condition that the first SL channel is transmitted on the first carrier as an example, the embodiment may be also applied to the condition that the first SL channel is transmitted on a first Bandwidth Part (BWP) and the terminal determines the basic parameter set for the first SL channel according to the first BWP and a corresponding relationship. Elaborations are omitted hereinafter.

A Third Scenario

When the first SL channel is a first-type SL channel, the first basic parameter set among the at least one basic parameter set is determined as the basic parameter set adopted for the first SL channel based on the first-type SL channel and a third corresponding relationship. The third corresponding relationship is a corresponding relationship between at least one type of channels and the at least one basic parameter set.

In this scenario, the at least one type of channels may be multiple types, and the first-type SL channel is a channel adopted by the terminal device. For example, the at least one type of channels may include a physical sidelink broadcast channel (PSBCH) or a channel transmitting a primary sidelink synchronization signal (PSSS)/secondary sidelink synchronization signal (SSSS) and may also include another type of channels. Elaborations are omitted herein. Correspondingly, a basic parameter set, for example, including the subcarrier spacing 15 kHz and the normal CP, may be adopted for the PSBCH or the channel transmitting the PSSS/SSSS. Another basic parameter set may be adopted for another type of channels.

A Fourth Scenario

When data transmitted through the first SL channel has a first service feature, the first basic parameter set among the at least one basic parameter set is determined as the basic parameter set adopted for the first SL channel based on the first service feature and a fourth corresponding relationship. The fourth corresponding relationship is a corresponding relationship between at least one service feature and the at least one basic parameter set.

In this scenario, data with multiple service features may be transmitted through a SL channel. When the data transmitted through the SL channel has the first service feature, the first basic parameter set may be selected from the fourth corresponding relationship based on the first service feature.

For example, the at least one basic parameter set may be two basic parameter sets. Correspondingly, there is made such a hypothesis that there are two types of services to be transmitted. That is, two basic parameter sets are predefined. A first basic parameter set is adopted when a service to be transmitted is a first-type service, and a second basic parameter set is adopted when the service to be transmitted is a second-type service.

A feature of a service to be transmitted includes one of: a delay requirement and Quality of Service (QoS) information of the service to be transmitted. For example, when different types of services to be transmitted are divided, the services may be divided based on delay requirements of the services. For example, a high-delay service to be transmitted and a low-delay service to be transmitted may be divided. Or, division may be performed based on QoS. For example, the services may be divided based on QoS Class Identifiers (QCIs). It is hypothesized that QCIs 1 to 5 represent first-type services and QCIs 6 to 9 represent second-type services. Another division manner may also be adopted. Services may be divided into three or more types, and each type of services corresponds to a different basic parameter set.

For example, the service to be transmitted may be divided into two types according to the delay requirement. Type 1 corresponds to a case that a delay is less than or equal to 10 ns. Type 2 corresponds to a case that a delay is greater than 10 ms. For the type 1, a corresponding basic parameter set includes the subcarrier spacing 50 kHz. For the type 2, a corresponding basic parameter set includes the subcarrier spacing 15 kHz. When the data transmitted through the first SL channel belongs to a service of the type 1, subcarrier spacing 60 kHz may be adopted for data transmission. When the data transmitted through the first SL channel belongs to a service of the type 2, the subcarrier spacing 15 kHz may be adopted for data transmission.

A Fifth Scenario

When a synchronization source of a first synchronization source type is adopted for the first SL channel, the first basic parameter set among the at least one basic parameter set is determined as the basic parameter set adopted for the first SL channel based on the first synchronization source type and a fifth corresponding relationship. The fifth corresponding relationship is a corresponding relationship between at least one synchronization source type and the at least one basic parameter set.

For example, V2X includes the following synchronization source types {Global Navigation Satellite System (GNSS), Evolved Node B (eNB), User Equipment (UE)}. When different types of synchronization sources are adopted, different basic parameter sets are adopted for channels. For example, when an eNB is adopted as a synchronization source, the normal CP is adopted. When a GNSS is adopted as the synchronization source, the extended CP is adopted. It is to be understood that the above is only an example. Other corresponding manners may be adopted during practical processing and will not be exhausted in the embodiment.

It is finally to be pointed out that, under the first condition, the first SL channel is a physical sidelink shared channel (PSSCH), or a physical sidelink control channel (PSCCH) or a PSBCH. It is also to be understood that the first SL channel may also be a channel of another type. Elaborations are omitted herein.

A second condition: the basic parameter set adopted for the first SL channel is determined according to indication of a second channel, specifically as follows.

The basic parameter set adopted for the first SL channel may be determined according to explicit indication or implicit indication of the second channel.

A First Scenario

When the second channel includes first indication information, the basic parameter set adopted for the first SL channel is determined based on the first indication information. The first indication information is configured to indicate the basic parameter set adopted for the first SL channel.

That is, the second channel may transmit the first indication information, and the basic parameter set adopted for the first SL channel may be determined based on the first indication information transmitted by the second channel.

In such a manner, the basic parameter set adopted for the first SL channel is explicitly indicated through the second channel.

In this scenario, the first SL channel is a PSSCH, and the second channel is a PSCCH or a physical downlink control channel (PDCCH). There may also be another condition. For example, the first SL channel is a PSCCH and the second channel is a PDCCH.

A basic parameter set adopted for the second channel may be pre-configured or may also be configured by the network.

For example, when the second channel adopts explicit indication, the basic parameter set may be determined directly based on the indication information carried in the second channel. For example, when 1 bit information is adopted, the basic parameter set for the first SL channel may be indicated by the 1 bit information. In case of more than two basic parameter sets, more bits may be adopted to indicate the basic parameter sets for the first SL channel. For example, 3 bits may be adopted for indication. There is made such a hypothesis that 000 is configured to indicate the first basic parameter set, 001 is configured to indicate a second basic parameter set and 010 is configured to indicate a third basic parameter set. It is to be understood that there may be such a condition that more bits are adopted to indicate more basic parameter sets. Exhaustions are omitted in the embodiment.

For example, an eighth corresponding relationship may be pre-configured or configured by the network. The eighth corresponding relationship may include at least one piece of index information and a basic parameter set corresponding to the at least one piece of index information. A piece of index information may be carried in the second channel, and the basic parameter set for the first SL channel may be determined based on the index information and the eighth corresponding relationship.

A Second Scenario

The second channel adopts implicit indication, including: indicating through a demodulation reference signal (DMRS) of the second channel or through scrambling information of the second channel.

Indication through the DMRS of the second channel may include that the basic parameter set adopted for the first SL channel is determined based on a sixth corresponding relationship and at least one of a DMRS sequence corresponding to the second channel, a cyclic shift, an orthogonal cover code (OCC), a resource position and a root sequence. The sixth corresponding relationship is a corresponding relationship between the basic parameter set and at least one of the following information: the DMRS sequence, the cyclic shift, the OCC, the resource position and the root sequence.

It is to be understood that the sixth corresponding relationship may also be configured by the network side or pre-configured. For example, indicating through a DMRS of a PSCCH may refer to indicating different basic parameter sets through DMRS sequences, cyclic shifts, OCCs, resource positions, root sequences and the like. Specifically, different DMRS sequences may correspond to different basic parameter sets, different cyclic shifts may also correspond to different basic parameter sets, different OCCs may correspond to different basic parameter sets, different resource positions may correspond to different basic parameter sets, and different root sequences may correspond to different basic parameter sets. Each parameter may be simultaneously used or may also be partially used, or only one parameter may be adopted to correspond to the basic parameter set.

And/or, indicating through the scrambling information of the second channel may include that the basic parameter set adopted for the first SL channel is determined based on the scrambling information of the second channel and a seventh corresponding relationship. The seventh corresponding relationship is a corresponding relationship between at least one piece of scrambling information and the at least one basic parameter set.

That is, the seventh corresponding relationship may be pre-configured or configured by the network side. The basic parameter set adopted for the first SL channel may be determined based on a scrambling code adopted for the second channel. For example, scrambling processing is required to be performed on an information bit of the second channel, i.e., a PSCCH. The basic parameter set adopted for the first SL channel, for example, a PSSCH, may be implicitly indicated through different scrambling sequences adopted for the second channel.

During practical transmission, the first SL channel and the second channel may be transmitted in a Time Division Multiplexing (TDM) manner. First K symbols may be occupied by the second channel, and the other symbols may be occupied by the first SL channel. In such case, different basic parameter sets may be adopted for the first SL channel and the second channel, for example, the PSSCH and the PSCCH. For example, the subcarrier spacing 15 kHz may be adopted for the PSCCH, and the subcarrier spacing 30 kHz may be adopted for the PSSCH.

The basic parameter set adopted for the second channel may be configured according to a corresponding relationship. A manner for determining the basic parameter set for the second channel may be any of the manners under the abovementioned multiple scenarios. For example, the basic parameter set adopted for the second channel may be determined based on at least one of the first corresponding relationship to the fifth corresponding relationship. Elaborations are omitted herein.

Furthermore, in the second condition, the first SL channel may be a PSSCH, and the second channel may be a PSCCH or a PDCCH.

Or, the first SL channel may be a PSCCH, and the second channel may be a PDCCH.

It can also be understood that there are more pairing manners for the first SL channel and the second channel and exhaustions are omitted herein.

It can be seen that, with adoption of the solution, when the terminal device transmits data through a channel, the data may be transmitted based on the selected basic parameter set. In such a manner, the problem of how to select a basic parameter set to send and receive data under the condition that there are multiple basic parameter sets is solved, so that the intersection efficiency of a terminal is ensured.

Embodiment 2

Figure 4:
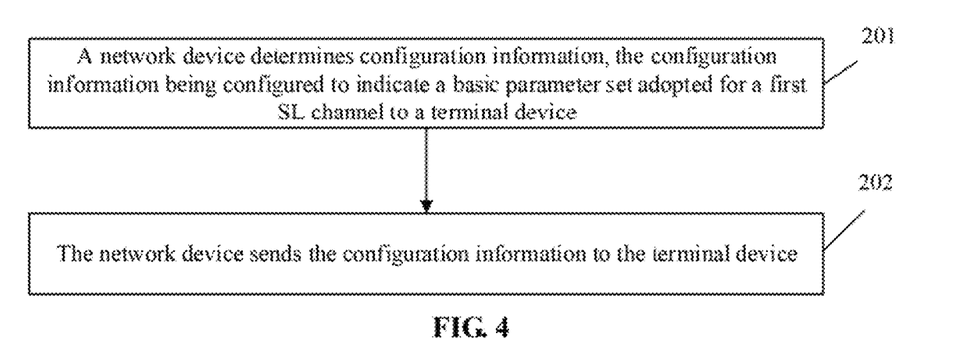
FIG. 4 is a second flowchart of a data transmission method according to an embodiment of the disclosure.

The embodiment of the disclosure provides a data transmission method, which, as shown in FIG. 4, includes the following operations.

In operation 201, a network device determines configuration information, the configuration information being configured for a terminal device to determine a basic parameter set adopted for a first SL channel.

In operation 202, the network device sends the configuration information to the terminal device.

The method may further include that: at least one basic parameter set is configured for the terminal device. That is, in the solution provided in the embodiment, a network side may further configure one or more basic parameter sets for the terminal device in advance. A configuration manner may be sent through system signaling or in another manner. Exhaustions are omitted herein.

The configuration information is configured to indicate at least one of:

a first corresponding relationship between at least one resource pool and the at least one basic parameter set;

a second corresponding relationship between at least one carrier and the at least one basic parameter set;

a third corresponding relationship between at least one type of channels and the at least one basic parameter set;

a fourth corresponding relationship between at least one feature of services to be transmitted and the at least one basic parameter set: and a fifth corresponding relationship between at least one synchronization source type and the at least one basic parameter set.

The basic parameter set may include information such as a subcarrier spacing, a CP length and a type. For example, in 5G NR, supported subcarrier spacings may include 15 kHz, 30 kHz, 60 kHz, 120 kHz and the like, and supported CP types include a normal CP and an extended CP.

Two conditions of corresponding relationship and indication information will be described below respectively.

A first condition: the basic parameter set adopted for the first SL channel is determined according to a corresponding relationship. Under this condition, the terminal device may select one basic parameter set from the at least one basic parameter set as the basic parameter set for the first SL channel according to at least one corresponding relationship that is configured by the network side or pre-configured. The least one corresponding relationship is specifically described below.

A First Scenario

The configuration information is configured to indicate the first corresponding relationship between the at least one resource pool and the at least one basic parameter set.

In this scenario, when a first resource pool is adopted for the first SL channel of the terminal device, a first basic parameter set corresponding to the first resource pool may be selected according to the first corresponding relationship configured by the network side.

For example, in V2X, one or more resource pools may be configured in a manner of configuration by the network side or pre-configuration, and each resource pool has a corresponding basic parameter set. For example, the subcarrier spacing 15 kHz and the normal CP are adopted for a resource pool 1, and the subcarrier spacing 60 kHz and the extended CP are adopted for a resource pool 2. It may be determined according to the first corresponding relationship that different resource pools may correspond to different basic parameter sets. The first corresponding relationship represents the corresponding relationship between a resource pool and the basic parameter set. The resource in the first resource pool is adopted for the first SL channel, and the basic parameter set of the resource pool may be determined according to the first corresponding relationship, namely the basic parameter set adopted for the first SL channel is determined.

The first corresponding relationship between the at least one resource pool and the at least one basic parameter set may be determined in the manner of configuration by the network side or pre-configuration.

In addition, the network side may also configure the basic parameter set of each resource pool through RRC signaling.

A Second Scenario

The configuration information is configured to indicate the second corresponding relationship between the at least one carrier and the at least one basic parameter set.

In this scenario, when the first SL channel of the terminal device is transmitted on a first carrier, the first basic parameter set corresponding to the first carrier may be selected according to the second corresponding relationship.

In this scenario, multiple carriers may be supported. For example, in V2X of Rel-15, 8 carriers may be supported, and different basic parameter sets may be configured for the 8 carriers respectively.

For example, considering a terminal backwards compatible with Rel-14 or Rel-15, a basic parameter set including 15 kHz and the normal CP is adopted for a Rel-14 or Rel-15 carrier. Another basic parameter set may be adopted for another carrier.

It is to be pointed out that the above is only an example and a basic parameter set specifically adopted for a specific carrier may be determined in the manner of pre-configuration or configuration by the network side.

In addition, the second corresponding relationship that different carriers correspond to different basic parameter sets may be that different carrier frequency bands correspond to different basic parameter sets. For example, NR-V2X supports two carrier frequency bands, i.e., FR 1 and FR2. The second corresponding relationship may be that different basic parameter sets may be adopted in different carrier frequency bands. For example, the subcarrier spacing 30 kHz may be adopted in the FR1 such as 3.4 GHz, and the subcarrier spacing 120 kHz may be adopted in the FR2 such as 30 GHz.

In this scenario, basic parameter sets corresponding to different types may also be determined according to the carrier types.

Specifically, the configured second corresponding relationship may also be that a basic parameter set corresponding to a first-type carrier is a basic parameter set the same as that for uplink data and that a basic parameter set corresponding to a second-type carrier is a basic parameter set the same as or different from that for the uplink data. The first-type carrier is a carrier configured to transmit the uplink data, and the second-type carrier is a dedicated carrier. For example, V2X may work on a dedicated carrier (5.9 GHz) or may also work on an uplink carrier. The subcarrier spacing 30 kHz may be adopted for uplink data transmitted on the uplink carrier. When V2X data is transmitted on the uplink carrier, the V2X data may be also transmitted by use of the same subcarrier spacing 30 kHz for the uplink data. When the V2X data is transmitted on the dedicated carrier, a basic parameter set that is pre-configured or configured by the network is adopted, and the basic parameter set may be the same as or different from the basic parameter set for the uplink data.

It is to be understood that the descriptions are made in the abovementioned embodiment with the condition that the first SL channel is transmitted on the first carrier as an example, the embodiment may be also applied to the condition that the first SL channel is transmitted on a first BWP and the terminal determines the basic parameter set for the first SL channel according to the first BWP and a corresponding relationship. Elaborations are omitted hereinafter.

A Third Scenario

The configuration information is configured to indicate the third corresponding relationship between the at least one type of channels and the at least one basic parameter set.

In this scenario, at least one type of channels may be multiple types, and for example, may include a PSBCH or a channel transmitting a PSSS/SSSS and may also include another type of channels. Elaborations are omitted herein. Correspondingly, a basic parameter set, for example, including the subcarrier spacing 15 kHz and the normal CP, may be adopted for the PSBCH or the channel transmitting the PSSS/SSSS. Another basic parameter set may be adopted for another type of channels.

A Fourth Scenario

The configuration information is configured to indicate the fourth corresponding relationship between the at least one feature of services to be transmitted and the at least one basic parameter set.

In this scenario, data with multiple service features may be transmitted through a SL channel. For example, when the data transmitted by the terminal device has a first service feature, the first basic parameter set may be selected from the fourth corresponding relationship based on the first service feature.

For example, the at least one basic parameter set may be two basic parameter sets. Correspondingly, there is made such a hypothesis that there are two types of services to be transmitted. That is, two basic parameter sets are predefined. A first basic parameter set is adopted when a service to be transmitted is a first-type service, and a second basic parameter set is adopted when the service to be transmitted is a second-type service.

A feature of a service to be transmitted includes one of a delay requirement and QoS information of the service to be transmitted. For example, when different types of services to be transmitted are divided, the services may be divided based on delay requirements of the services. For example, a high-delay service to be transmitted and a low-delay service to be transmitted may be divided. Or, division may be performed based on QoS. For example, the services may be divided based on QoS Class Identifiers (QCs). It is hypothesized that QCIs 1 to 5 represent first-type services and QCIs 6 to 9 represent second-type services. Another division manner may also be adopted. Services may be divided into three or more types, and each type of services corresponds to a different basic parameter set.

For example, the services to be transmitted may be divided into two types according to the delay requirement. Type 1 corresponds to a case that a delay is less than or equal to 10 ms. Type 2 corresponds to a case that a delay is greater than 10 ms. For the type 1, a corresponding basic parameter set includes the subcarrier spacing 50 kHz. For the type 2, a corresponding basic parameter set includes the subcarrier spacing 15 kHz. When the data transmitted through the first SL channel belongs to a service of the type 1, subcarrier spacing 60 kHz may be adopted for data transmission. When the data transmitted through the first SL channel belongs to a service of the type 2, the subcarrier spacing 15 kHz may be adopted for data transmission.

A Fifth Scenario

The configuration information is configured to indicate the fifth corresponding relationship between the at least one synchronization source type and the at least one basic parameter set.

For example, V2X includes the following synchronization source types {GNSS, eNB, UE}. When different types of synchronization sources are adopted, different basic parameter sets are adopted for channels. For example, when an eNB is adopted as a synchronization source, the normal CP is adopted. When a GNSS is adopted as the synchronization source, the extended CP is adopted. It is to be understood that the above is only an example. Other corresponding manners may be adopted during practical processing and will not be exhausted in the embodiment.

It is finally to be pointed out that, under the first condition, the first SL channel is one of a PSSCH, or a PSCCH or a PSBCH. It is also to be understood that the first SL channel may also be a channel of another type. Elaborations are omitted herein.

A second condition: the network device sends indication information to the terminal device through a second channel.

A First Scenario

The second channel includes first indication information, the first indication information being configured to indicate the basic parameter set adopted for the first SL channel.

That is, the second channel may transmit the first indication information, and the basic parameter set adopted for the first SL channel may be determined based on the first indication information transmitted by the second channel.

In such a manner, the basic parameter set adopted for the first SL channel is explicitly indicated through the second channel.

In this scenario, the first SL channel is a PSSCH, and the second channel is a PSCCH or a PDCCH. There may also be another condition. For example, the first SL channel is a PSCCH and the second channel is a PDCCH.

A basic parameter set adopted for the second channel may be pre-configured or may also be configured by the network.

For example, when the second channel adopts explicit indication, the basic parameter set may be determined directly based on the indication information carried in the second channel. For example, when 1 bit information is adopted, the basic parameter set for the first SL channel may be indicated by the 1 bit information. In case of more than two basic parameter sets, more bits may be adopted to indicate the basic parameter sets for the first SL channel. For example, 3 bits may be adopted for indication. There is made such a hypothesis that 00 is configured to indicate the first basic parameter set, 001 is configured to indicate a second basic parameter set and 010 is configured to indicate a third basic parameter set. It is to be understood that there may be such a condition that more bits are adopted to indicate more basic parameter sets. Exhaustions are omitted in the embodiment.

For example, an eighth corresponding relationship may be pre-configured or configured by the network. The eighth corresponding relationship may include at least one piece of index information and a basic parameter set corresponding to the at least one piece of index information. A piece of index information may be carried in the second channel, and the basic parameter set for the first SL channel may be determined based on the index information and the eighth corresponding relationship.

A Second Scenario

The second channel adopts implicit indication, and the configuration information is further configured to indicate at least one of:

a sixth corresponding relationship between the at least one basic parameter set and at least one of the following information: the DMRS sequence, the cyclic shift, the OCC, the resource position and the root sequence; and a seventh corresponding relationship between at least one scrambling code and the at least one basic parameter set.

That is, the network device may implement implicit indication through a DMRS of the second channel. It is to be understood that the sixth corresponding relationship may also be configured by the network side or pre-configured. For example, indicating through a DMRS of a PSCCH may refer to indicating different basic parameter sets through DMRS sequences, cyclic shifts, OCCs, resource positions, root sequences and the like. Specifically, different DMRS sequences may correspond to different basic parameter sets, different cyclic shifts may also correspond to different basic parameter sets, different OCCs may correspond to different basic parameter sets, different resource positions may correspond to different basic parameter sets, and different root sequences may correspond to different basic parameter sets. Each parameter may be simultaneously used or may also be partially used. Or, only one parameter may be adopted to correspond to the basic parameter set.

And/or, the network device may implement implicit indication through scrambling information of the second channel. That is, the seventh corresponding relationship may be pre-configured or configured by the network side such that the terminal device can determine the basic parameter set adopted for the first SL channel based on a scrambling code adopted for the second channel. For example, scrambling processing is required to be performed on an information bit of the second channel, i.e., a PSCCH. The basic parameter set adopted for the first SL channel, for example, a PSSCH, may be implicitly indicated through different scrambling sequences adopted for the second channel.

During practical transmission, the first SL channel and the second channel may be transmitted in a TDM manner. First K symbols may be occupied by the second channel, and other symbols may be occupied by the first SL channel. In such case, different basic parameter sets may be adopted for the first SL channel and the second channel. For example, the subcarrier spacing 15 kHz may be adopted for the first SL channel, and the subcarrier spacing 30 kHz may be adopted for the second channel.

The basic parameter set adopted for the second channel may be configured according to a corresponding relationship. A manner for determining the basic parameter set for the second channel may be any one of the manners under the abovementioned multiple scenarios. For example, the basic parameter set adopted for the second channel may be determined based on at least one of the first corresponding relationship to the fifth corresponding relationship. Elaborations are omitted herein.

Furthermore, in the second condition, the first SL channel may be a PSSCH, and the second channel may be a PDCCH.

Or, the first SL channel may be a PSCCH, and the second channel may be a PDCCH.

It can also be understood that there are more pairing manners for the first SL channel and the second channel and exhaustions are omitted herein.

It can be seen that, with adoption of the solution, when the terminal device transmits data through a channel, the data may be transmitted based on the selected basic parameter set. In such a manner, the problem of how to select a basic parameter set to send and receive data under the condition that there are multiple basic parameter sets is solved, so that the intersection efficiency of a terminal is ensured.

Embodiment 3

Figure 5:
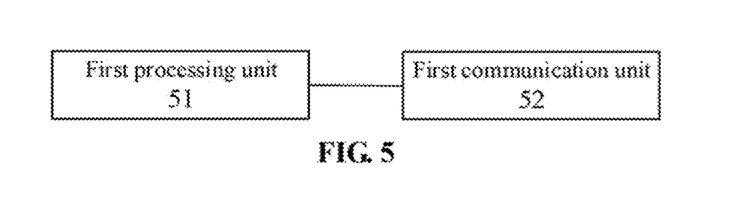
FIG. 5 is a composition structure diagram of a terminal device according to an embodiment of the disclosure.

The embodiment of the disclosure provides a terminal device, which, as shown in FIG. 5, includes a first processing unit 51 and a first communication unit 52.

The first processing unit 51 is configured to determine a basic parameter set adopted for a first SL channel.

The first communication unit 52 is configured to perform data transmission on the first SL channel based on the basic parameter set.

The terminal device may acquire and save at least one basic parameter set based on a pre-configuration or a configuration made by a network side.

The basic parameter set may include information such as a subcarrier spacing, a CP length and a type. For example, in 50G NR, supported subcarrier spacings may include 5 kHz, 30 kH, 60 kHz, 120 kHz and the like, and supported CP types may include a normal CP and an extended CP.

Two conditions of corresponding relationship and indication information will be described below respectively.

A first condition: the first processing unit 51 may determine the basic parameter set adopted for the first SL channel according to a corresponding relationship. Under this condition, the terminal device may select one basic parameter set from the at least one basic parameter set as the basic parameter set for the first SL channel according to at least one corresponding relationship that is configured by the network side or pre-configured. The least one corresponding relationship is specifically described below.

A First Scenario

The first processing unit 51, when a resource in a first resource pool is used for the first SL channel, may determine a first basic parameter set among the at least one basic parameter set as the basic parameter set adopted for the first SL channel based on the first resource pool and a first corresponding relationship. The first corresponding relationship is a corresponding relationship between at least one resource pool and the at least one basic parameter set.

In this scenario, when the first resource pool is adopted for the first SL channel, the first basic parameter set corresponding to the first resource pool may be selected according to the first corresponding relationship.

For example, in V2X, one or more resource pools may be configured in a manner of configuration by the network side or pre-configuration, and each resource pool has a corresponding basic parameter set. For example, the subcarrier spacing 15 kHz and the normal CP are adopted for a resource pool 1, and the subcarrier spacing 60 kHz and the extended CP are adopted for a resource pool 2. It may be determined according to the first corresponding relationship that different resource pools may correspond to different basic parameter sets. The first corresponding relationship represents the corresponding relationship between a resource pool and the basic parameter set. When the resource in the first resource pool is adopted for the first SL channel, the basic parameter set of the resource pool may be determined according to the first corresponding relationship, namely the basic parameter set adopted for the first SL channel is determined.

The first corresponding relationship between the at least one resource pool and the at least one basic parameter set may be determined in the manner of configuration by the network side or pre-configuration.

In addition, the network side may also configure the basic parameter set of each resource pool through RRC signaling.

A Second Scenario

The first processing unit 51, when the first SL channel is transmitted on a first carrier, may determine the first basic parameter set among the at least one basic parameter set as the basic parameter set adopted for the first SL channel based on the first carrier and a second corresponding relationship. The second corresponding relationship is a corresponding relationship between at least one carrier and the at least one basic parameter set.

In this scenario, when the first SL channel is transmitted on the first carrier, the first processing unit 51 may select the first basic parameter set corresponding to the first carrier according to the second corresponding relationship.

In this scenario, multiple carriers may be supported. For example, in V2X of Rel-15, 8 carriers may be supported, and different basic parameter sets may be configured for the 8 carriers respectively.

For example, considering a terminal backwards compatible with Rel-14 or Rel-15, a basic parameter set including 15 kHz and the normal CP is adopted for a Rel-14 or Rel-15 carrier. Another basic parameter set may be adopted for another carrier.

It is to be pointed out that the above is only an example and a basic parameter set specifically adopted for a specific carrier may be determined in the manner of pre-configuration or configuration by the network side.

In addition, the second corresponding relationship that different carriers correspond to different basic parameter sets may be that different carrier frequency bands correspond to different basic parameter sets. For example, NR-V2X supports two carrier frequency bands, i.e., FR 1 and FR2. The second corresponding relationship may be that different basic parameter sets may be adopted in different carrier frequency bands. For example, the subcarrier spacing 30 kHz may be adopted in the FR1 such as 3.4 GHz, and the subcarrier spacing 120 kHz may be adopted in the FR2 such as 30 GHz.

In this scenario, basic parameter sets corresponding to different types may also be determined according to the carrier types.

Specifically, when the first carrier is a carrier configured to transmit uplink data, it may be determined based on the first carrier and the second corresponding relationship that a same basic parameter set as that for the uplink data is adopted for the first SL channel.

That is, the configured second corresponding relationship may also be that a basic parameter set corresponding to a first-type carrier is a basic parameter set the same as that for uplink data and that a basic parameter set corresponding to a second-type carrier is a basic parameter set the same as or different from that for the uplink data.

The first-type carrier is a carrier configured to transmit the uplink data, and the second-type carrier is a dedicated carrier. For example, V2X may work on a dedicated carrier (5.9 GHz) or may also work on an uplink carrier. The subcarrier spacing 30 kHz may be adopted for uplink data transmitted on the uplink carrier. When V2X data is transmitted on the uplink carrier, the V2X data may be also transmitted by use of the same subcarrier spacing 30 kHz for the uplink data. When the V2X data is transmitted on the dedicated carrier, a basic parameter set that is pre-configured or configured by the network is adopted, and the basic parameter set may be the same as or different from the basic parameter set for the uplink data.

It is to be understood that the descriptions are made in the abovementioned embodiment with the condition that the first SL channel is transmitted on the first carrier as an example, the embodiment may be also applied to the condition that the first SL channel is transmitted on a first BWP and the terminal determines the basic parameter set for the first SL channel according to the first BWP and a corresponding relationship. Elaborations are omitted hereinafter.

A Third Scenario

The first processing unit 51, when the first SL channel is a first-type SL channel, may determine the first basic parameter set among the at least one basic parameter set as the basic parameter set adopted for the first SL channel based on the first-type SL channel and a third corresponding relationship. The third corresponding relationship is a corresponding relationship between at least one type of channels and the at least one basic parameter set.

In this scenario, the at least one type of channels may be multiple types, and the first-type SL channel is a channel adopted by the terminal device. For example, the at least one type of channels may include a PSBCH or a channel transmitting a PSSS/SSSS and may also include another type of channels. Elaborations are omitted herein. Correspondingly, a basic parameter set, for example, including the subcarrier spacing 15 kHz and the normal CP, may be adopted for the PSBCH or the channel transmitting the PSSS/SSSS. Another basic parameter set is adopted for another type of channels.

A Fourth Scenario

The first processing unit 51, when data transmitted through the first SL channel has a first service feature, may determine the first basic parameter set among the at least one basic parameter set as the basic parameter set adopted for the first SL channel based on the first service feature and a fourth corresponding relationship. The fourth corresponding relationship is a corresponding relationship between at least one service feature and the at least one basic parameter set.

In this scenario, data with multiple service features may be transmitted through a SL channel. When the data transmitted through the SL channel has the first service feature, the first basic parameter set may be selected from the fourth corresponding relationship based on the first service feature.

For example, the at least one basic parameter set may be two basic parameter sets. Correspondingly, there is made such a hypothesis that there are two types of services to be transmitted. That is, two basic parameter sets are predefined. A first basic parameter set is adopted when a service to be transmitted is a first-type service, and a second basic parameter set is adopted when the service to be transmitted is a second-type service.

A feature of a service to be transmitted includes one of: a delay requirement and Quality of Service (QoS) information of the service to be transmitted. For example, when different types of services to be transmitted are divided, the services may be divided based on delay requirements of the services. For example, a high-delay service to be transmitted and a low-delay service to be transmitted may be divided. Or, division may be performed based on QoS. For example, the services may be divided based on QoS Class Identifiers (QCIs). It is hypothesized that QCIs 1 to 5 represent first-type services and QCIs 6 to 9 represent second-type services. Another division manner may also be adopted.

Services may be divided into three or more types, and each type of services corresponds to a different basic parameter set.

For example, the service to be transmitted may be divided into two types according to the delay requirement. Type 1 corresponds to a case that a delay is less than or equal to 10 ms. Type 2 corresponds to a case that a delay is greater than 10 ms. For the type 1, a corresponding basic parameter set includes the subcarrier spacing 50 kHz. For the type 2, a corresponding basic parameter set includes the subcarrier spacing 15 kHz. When the data transmitted through the first SL channel belongs to a service of the type 1, subcarrier spacing 60 kHz may be adopted for data transmission. When the data transmitted through the first SL channel belongs to a service of the type 2, the subcarrier spacing 15 kHz may be adopted for data transmission.

A Fifth Scenario

The first processing unit 51, when a synchronization source of a first synchronization source type is adopted for the first SL channel, may determine the first basic parameter set among the at least one basic parameter set as the basic parameter set adopted for the first SL channel based on the first synchronization source type and a fifth corresponding relationship. The fifth corresponding relationship is a corresponding relationship between at least one synchronization source type and the at least one basic parameter set.

For example, V2X includes the following synchronization source types {GNSS, eNB, UE}. When different types of synchronization sources are adopted, different basic parameter sets are adopted for channels. For example, when an eNB is adopted as a synchronization source, the normal CP is adopted. When a GNSS is adopted as the synchronization source, the extended CP is adopted. It is to be understood that the above is only an example. Other corresponding manners may be adopted during practical processing and will not be exhausted in the embodiment.

It is finally to be pointed out that, under the first condition, the first SL channel is one of a PSSCH, or a PSCCH or a PSBCH. It is also to be understood that the first SL channel may also be a channel of another type. Elaborations are omitted herein.

A second condition: the first processing unit 51 determines the basic parameter set adopted for the first SL channel according to indication of a second channel, specifically as follows.

The first processing unit 51 may determine the basic parameter set adopted for the first SL channel according to explicit indication or implicit indication of the second channel.

A First Scenario

When the second channel includes first indication information, the first processing unit 51 may determine the basic parameter set adopted for the first SL channel based on the first indication information. The first indication information is configured to indicate the basic parameter set adopted for the first SL channel.

That is, the second channel may transmit the first indication information, and the basic parameter set adopted for the first SL channel may be determined based on the first indication information transmitted by the second channel.

In such a manner, the basic parameter set adopted for the first SL channel is explicitly indicated through the second channel.

In this scenario, the first SL channel is a PSSCH, and the second channel is a PSCCH or a PDCCH. Of course, there may also be another condition. For example, the first SL channel is a PSCCH and the second channel is a PDCCH.

A basic parameter set adopted for the second channel may be pre-configured or may also be configured by the network.

For example, when the second channel adopts explicit indication, and the basic parameter set may be determined directly based on the indication information carried in the second channel. For example, when 1 bit information is adopted, the basic parameter set for the first SL channel may be indicated by the 1 bit information. In case of more than two basic parameter sets, more bits may be adopted to indicate the basic parameter sets for the first SL channel. For example, 3 bits may be adopted for indication. There is made such a hypothesis that 00 is configured to indicate the first basic parameter set, 001 is configured to indicate a second basic parameter set and 010 is configured to indicate a third basic parameter set. It is to be understood that there may be such a condition that more bits are adopted to indicate more basic parameter sets. Exhaustions are omitted in the embodiment.

For example, an eighth corresponding relationship may be pre-configured or configured by the network. The eighth corresponding relationship may include at least one piece of index information and a basic parameter set corresponding to the at least one piece of index information. A piece of index information may be carried in the second channel, and the basic parameter set for the first SL channel may be determined based on the index information and the eighth corresponding relationship.

A Second Scenario

The second channel adopts implicit indication, which may include that the first processing unit 51 implements indication through a DMRS of the second channel or implements indication through scrambling information of the second channel.

Indication through the DMRS of the second channel may include that the basic parameter set adopted for the first SL channel is determined based on a sixth corresponding relationship and at least one of a DMRS sequence corresponding to the second channel, a cyclic shift, an orthogonal cover code (OCC), a resource position and a root sequence. The sixth corresponding relationship is a corresponding relationship between the basic parameter set and at least one of the following information: the DMRS sequence, the cyclic shift, the OCC, the resource position and the root sequence.

It is to be understood that the sixth corresponding relationship may also be configured by the network side or pre-configured. For example, indicating through a DMRS of a PSCCH may refer to indicating different basic parameter sets through DMRS sequences, cyclic shifts, OCCs, resource positions, root sequences and the like. Specifically, different DMRS sequences may correspond to different basic parameter sets, different cyclic shifts may also correspond to different basic parameter sets, different OCCs may correspond to different basic parameter sets, different resource positions may correspond to different basic parameter sets, and different root sequences may correspond to different basic parameter sets. Each parameter may be simultaneously used or may also be partially used, or only one parameter may be adopted to correspond to the basic parameter set.

And/or, indication through the scrambling information of the second channel may include that the first processing unit SI determines the basic parameter set adopted for the first SL channel based on the scrambling information of the second channel and a seventh corresponding relationship. The seventh corresponding relationship is a corresponding relationship between at least one piece of scrambling information and the at least one basic parameter set.

That is, the seventh corresponding relationship may be pre-configured or configured by the network side. The basic parameter set adopted for the first SL channel may be determined based on a scrambling code adopted for the second channel. For example, scrambling processing is required to be performed on an information bit of the second channel, i.e., a PSCCH. The basic parameter set adopted for the first SL channel, for example, a PSSCH, may be implicitly indicated through different scrambling sequences adopted for the second channel.

During practical transmission, the first SL channel and the second channel may be transmitted in a TDM manner. First K symbols may be occupied by the second channel, and the other symbols may be occupied by the first SL channel. In such case, different basic parameter sets may be adopted for the first SL channel and the second channel, for example, the PSSCH and the PSCCH. For example, the subcarrier spacing 15 kHz may be adopted for the PSCCH, and the subcarrier spacing 30 kHz may be adopted for the PSSCH.

The basic parameter set adopted for the second channel may be configured according to a corresponding relationship. A manner for determining the basic parameter set for the second channel may be any of the manners under the abovementioned multiple scenarios. For example, the basic parameter set adopted for the second channel may be determined based on at least one of the first corresponding relationship to the fifth corresponding relationship. Elaborations are omitted herein.

Furthermore, in the second condition, the first SL channel may be a PSSCH, and the second channel may be a PSCCH or a PDCCH.

Or, the first SL channel may be a PSCCH, and the second channel may be a PDCCH.

It can also be understood that there are more pairing manners for the first SL channel and the second channel and exhaustions am omitted herein.

It can be seen that, with adoption of the solution, when the terminal device transmits data through a channel, the data may be transmitted based on the selected basic parameter set. In such a manner, the problem of how to select a basic parameter set to send and receive data under the condition that there are multiple basic parameter sets is solved, so that the intersection efficiency of a terminal is ensured.

Embodiment 4

Figure 6:
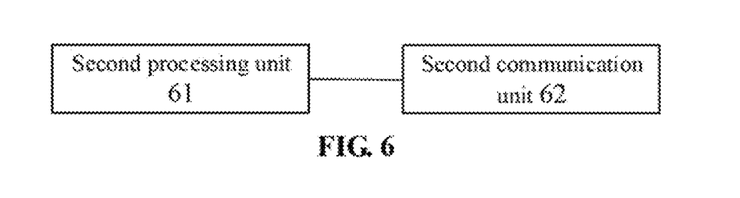
FIG. 6 is a composition structure diagram of a network device according to an embodiment of the disclosure.

The embodiment of the disclosure provides a network device, which, as shown in FIG. 6, includes a second processing unit 61 and a second communication unit 62.

The second processing unit 61 is configured to determine configuration information, the configuration information being configured for a terminal device to determine a basic parameter set adopted for a first SL channel.

The second communication unit 62 is configured to send the configuration information to the terminal device.

The second communication unit 62 may configure at least one basic parameter set for the terminal device. That is, in the solution provided in the embodiment, a network side may further configure one or more basic parameter sets for the terminal device in advance. A configuration manner may be sent through system signaling or may also be sent in another manner. Exhaustions are omitted herein.

The configuration information is configured to indicate at least one of:

a first corresponding relationship between at least one resource pool and the at least one basic parameter set;

a second corresponding relationship between at least one carrier and the at least one basic parameter set;

a third corresponding relationship between at least one type of channels and the at least one basic parameter set;

a fourth corresponding relationship between at least one feature of services to be transmitted and the at least one basic parameter set: and a fifth corresponding relationship between at least one synchronization source type and the at least one basic parameter set.

The basic parameter set may include information such as a subcarrier spacing, a CP length and a type. For example, in 5G NR, supported subcarrier spacings may include 15 kHz, 30 kHz, 60 kHz, 120 kHz and the like, and supported CP types include a normal CP and an extended CP.

Two conditions of corresponding relationship and indication information will be described below respectively.

A first condition: the basic parameter set adopted for the first SL channel is determined according to a corresponding relationship. Under this condition, the terminal device may select one basic parameter set from the at least one basic parameter set as the basic parameter set for the first SL channel according to at least one corresponding relationship that is configured by the network side or pre-configured. The least one corresponding relationship is specifically described below.

A First Scenario

The configuration information is configured to indicate the first corresponding relationship between the at least one resource pool and the at least one basic parameter set.

In this scenario, when a first resource pool is adopted for the first SL channel of the terminal device, a first basic parameter set corresponding to the first resource pool may be selected according to the first corresponding relationship configured by the network side.

For example, in V2X, one or more resource pools may be configured in a manner of configuration by the network side or pre-configuration, and each resource pool has a corresponding basic parameter set. For example, the subcarrier spacing 15 kHz and the normal CP are adopted for a resource pool 1, and the subcarrier spacing 60 kHz and the extended CP are adopted for a resource pool 2. It may be determined according to the first corresponding relationship that different resource pools may correspond to different basic parameter sets. The first corresponding relationship represents the corresponding relationship between a resource pool and the basic parameter set. The resource in the first resource pool is adopted for the first SL channel, and the basic parameter set of the resource pool may be determined according to the first corresponding relationship, namely the basic parameter set adopted for the first SL channel is determined.

The first corresponding relationship between the at least one resource pool and the at least one basic parameter set may be determined in the manner of configuration by the network side or pre-configuration.

In addition, the network side may also configure the basic parameter set of each resource pool through RRC signaling.

A Second Scenario

The configuration information is configured to indicate the second corresponding relationship between the at least one carrier and the at least one basic parameter set.

In this scenario, when the first SL channel of the terminal device is transmitted on a first carrier, the first basic parameter set corresponding to the first carrier may be selected according to the second corresponding relationship.

In this scenario, multiple carriers may be supported. For example, in V2X of Rel-15, 8 carriers may be supported, and different basic parameter sets may be configured for the 8 carriers respectively.

For example, considering a terminal backwards compatible with Rel-14 or Rel-15, a basic parameter set including 15 kHz and the normal CP is adopted for a Rel-14 or Rel-15 carrier. Another basic parameter set may be adopted for another carrier.

It is to be pointed out that the above is only an example and a basic parameter set specifically adopted for a specific carrier may be determined in the manner of pre-configuration or configuration by the network side.

In addition, the second corresponding relationship that different carriers correspond to different basic parameter sets may be that different carrier frequency bands correspond to different basic parameter sets. For example, NR-V2X supports two carrier frequency bands, i.e., FR 1 and FR2. The second corresponding relationship may be that different basic parameter sets may be adopted in different carrier frequency bands. For example, the subcarrier spacing 30 kHz may be adopted in the FR1 such as 34 GHz, and the subcarrier spacing 120 kHz may be adopted in the FR2 such as 30 GHz.

In this scenario, basic parameter sets corresponding to different types may also be determined according to the carrier types.

Specifically, the configured second corresponding relationship may also be that a basic parameter set corresponding to a first-type carrier is a basic parameter set the same as that for uplink data and that a basic parameter set corresponding to a second-type carrier is a basic parameter set the same as or different from that for the uplink data.

The first-type carrier is a carrier configured to transmit the uplink data, and the second-type carrier is a dedicated carrier. For example, V2X may work on a dedicated carrier (5.90 Hz) or may also work on an uplink carrier. The subcarrier spacing 30 kHz may be adopted for uplink data transmitted on the uplink carrier. When V2X data is transmitted on the uplink carrier, the V2X data may be also transmitted by use of the same subcarrier spacing 30 kHz for the uplink data. When the V2X data is transmitted on the dedicated carrier, a basic parameter set that is pre-configured or configured by the network is adopted, and the basic parameter set may be the same as or different from the basic parameter set for the uplink data.

It is to be understood that the descriptions are made in the abovementioned embodiment with the condition that the first SL channel is transmitted on the first carrier as an example, the embodiment may be also applied to the condition that the first SL channel is transmitted on a first BWP and the terminal determines the basic parameter set for the first SL channel according to the first BWP and a corresponding relationship. Elaborations are omitted hereinafter.

A Third Scenario

The configuration information is configured to indicate the third corresponding relationship between the at least one type of channels and the at least one basic parameter set.

In this scenario, at least one type of channels may be multiple types, and for example, the at least one type of channels may include a PSBCH or a channel transmitting a PSSS/SSSS and may also include another type of channels. Elaborations are omitted herein. Correspondingly, a basic parameter set, for example, including the subcarrier spacing 15 kHz and the normal CP, may be adopted for the PSBCH or the channel transmitting the PSSS/SSSS. Another basic parameter set may be adopted for another type of channels.

A Fourth Scenario

The configuration information is configured to indicate the fourth corresponding relationship between the at least one feature of services to be transmitted and the at least one basic parameter set.

In this scenario, data with multiple service features may be transmitted through a SL channel. For example, when the data transmitted by the terminal device has a first service feature, the first basic parameter set may be selected from the fourth corresponding relationship based on the first service feature.

For example, the at least one basic parameter set may be two basic parameter sets. Correspondingly, there is made such a hypothesis that there are two types of services to be transmitted. That is, two basic parameter sets are predefined. A first basic parameter set is adopted when a service to be transmitted is a first-type service, and a second basic parameter set is adopted when the service to be transmitted is a second-type service.

A feature of a service to be transmitted includes one of a delay requirement and QoS information of the service to be transmitted. For example, when different types of services to be transmitted are divided, the services may be divided based on delay requirements of the services. For example, a high-delay service to be transmitted and a low-delay service to be transmitted may be divided. Or, division may be performed based on QoS. For example, the services may be divided based on QoS Class Identifiers (QCs). It is hypothesized that QCIs 1 to 5 represent first-type services and QCIs 6 to 9 represent second-type services. Another division manner may also be adopted. Services may be divided into three or more types, and each type of services corresponds to a different basic parameter set.

For example, the services to be transmitted may be divided into two types according to the delay requirement. Type 1 corresponds to a case that a delay is less than or equal to 10 ms. Type 2 corresponds to a case that a delay is greater than 10 ms. For the type 1, a corresponding basic parameter set includes the subcarrier spacing 50 kHz. For the type 2, a corresponding basic parameter set includes the subcarrier spacing 15 kHz. When the data transmitted through the first SL channel belongs to a service of the type 1, subcarrier spacing 60 kHz may be adopted for data transmission. When the data transmitted through the first SL channel belongs to a service of the type 2, the subcarrier spacing 15 kHz may be adopted for data transmission.

A Fifth Scenario

The configuration information is configured to indicate the fifth corresponding relationship between the at least one synchronization source type and the at least one basic parameter set.

For example, V2X includes the following synchronization source types {GNSS, eNB, UE}. When different types of synchronization sources are adopted, different basic parameter sets are adopted for channels. For example, when an eNB is adopted as a synchronization source, the normal CP is adopted. When a GNSS is adopted as the synchronization source, the extended CP is adopted. It is to be understood that the above is only an example. Other corresponding manners may be adopted during practical processing and will not be exhausted in the embodiment.

It is finally to be pointed out that, under the first condition, the first SL channel is one of a PSSCH, or a PSCCH or a PSBCH. It is also to be understood that the first SL channel may also be a channel of another type. Elaborations are omitted herein.

A second condition: the second communication unit 62 sends indication information to the terminal device through a second channel.

A First Scenario

The second channel includes first indication information, the first indication information being configured to indicate the basic parameter set adopted for the first SL channel.

That is, the second channel may transmit the first indication information, and the basic parameter set adopted for the first SL channel may be determined based on the first indication information transmitted by the second channel.

In such a manner, the basic parameter set adopted for the first SL channel is explicitly indicated through the second channel.

In this scenario, the first SL channel is a PSSCH, and the second channel is a PSCCH or a PDCCH. There may also be another condition. For example, the first SL channel is a PSCCH and the second channel is a PDCCH.

A basic parameter set adopted for the second channel may be pre-configured or may also be configured by the network.

For example, when the second channel adopts explicit indication, the basic parameter set may be determined directly based on the indication information carried in the second channel. For example, when 1 bit information is adopted, the basic parameter set for the first SL channel may be indicated by the 1 bit information. In case of more than two basic parameter sets, more bits may be adopted to indicate the basic parameter sets for the first SL channel. For example, 3 bits may be adopted for indication. There is made such a hypothesis that 000 is configured to indicate the first basic parameter set, 001 is configured to indicate a second basic parameter set and 010 is configured to indicate a third basic parameter set. It is to be understood that there may be such a condition that more bits are adopted to indicate more basic parameter sets. Exhaustions are omitted in the embodiment.

For example, an eighth corresponding relationship may be pre-configured or configured by the network. The eighth corresponding relationship may include at least one piece of index information and a basic parameter set corresponding to the at least one piece of index information. A piece of index information may be carried in the second channel, and the basic parameter set for the first SL channel may be determined based on the index information and the eighth corresponding relationship.

A Second Scenario

The second channel adopts implicit indication, and the configuration information is further configured to indicate at least one of:

a sixth corresponding relationship between the at least one basic parameter set and at least one of the following information: the DMRS sequence, the cyclic shift, the OCC, the resource position and the root sequence; and a seventh corresponding relationship between at least one scrambling code and the at least one basic parameter set.

That is, the network device may implement implicit indication through a DMRS of the second channel. It is to be understood that the sixth corresponding relationship may also be configured by the network side or pre-configured. For example, indicating through a DMRS of a PSCCH may refer to indicating different basic parameter sets through DMRS sequences, cyclic shifts, OCCs, resource positions, root sequences and the like. Specifically, different DMRS sequences may correspond to different basic parameter sets, different cyclic shifts may also correspond to different basic parameter sets, different OCCs may correspond to different basic parameter sets, different resource positions may correspond to different basic parameter sets, and different root sequences may correspond to different basic parameter sets. Each parameter may be simultaneously used or may also be partially used. Or, only one parameter may be adopted to correspond to the basic parameter set.

And/or, the network device may implement implicit indication through the scrambling information of the second channel, including that the basic parameter set adopted for the first SL channel may be determined based on the scrambling information of the second channel and a seventh corresponding relationship. The seventh corresponding relationship is a corresponding relationship between at least one piece of scrambling information and the at least one basic parameter set.

That is, the seventh corresponding relationship may be pre-configured or configured by the network side, and the basic parameter set adopted for the first SL channel may be determined based on a scrambling code adopted for the second channel. For example, scrambling processing is required to be performed on an information bit of the second channel, i.e., a PSCCH. The basic parameter set adopted for the first SL channel, for example, a PSSCH, may be implicitly indicated through different scrambling sequences adopted for the second channel.

During practical transmission, the first SL channel and the second channel may be transmitted in a TDM manner. First K symbols may be occupied by the second channel, and other symbols may be occupied by the first SL channel. In such case, different basic parameter sets may be adopted for the first SL channel and the second channel. For example, the subcarrier spacing 15 kHz may be adopted for the first SL channel, and the subcarrier spacing 30 kHz may be adopted for the second channel.

The basic parameter set adopted for the second channel may be configured according to a corresponding relationship. A manner for determining the basic parameter set for the second channel may be any one of the manners under the abovementioned multiple scenarios. For example, the basic parameter set adopted for the second channel may be determined based on at least one of the first corresponding relationship to the fifth corresponding relationship. Elaborations are omitted herein.

Furthermore, in the second condition, the first SL channel may be a PSSCH, and the second channel may be a PDCCH.

Or, the first SL channel may be a PSCCH, and the second channel may be a PDCCH.

It can also be understood that there are more pairing manners for the first SL channel and the second channel and exhaustions are omitted herein.

It can be seen that, with adoption of the solution, when the terminal device transmits data through a channel, the data may be transmitted based on the selected basic parameter set. In such a manner, the problem of how to select a basic parameter set to send and receive data under the condition that there are multiple basic parameter sets is solved, so that the intersection efficiency of a terminal is ensured.

Figure 7:
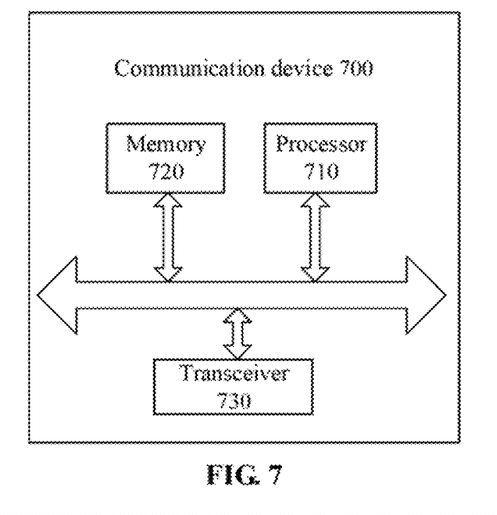
FIG. 7 is a composition structure diagram of a communication device according to an embodiment of the disclosure.

FIG. 7 is a schematic structure diagram of a communication device 70) according to an embodiment of the disclosure. The communication device 700 shown in FIG. 7 includes a processor 710, and the processor 710 may call and run a computer program in a memory to implement the method in the embodiments of the disclosure.

Optionally, as shown in FIG. 7, the communication device 700 may further include a memory 720. The processor 710 may call and run the computer program in the memory 720 to implement the method in the embodiments of the disclosure.

The memory 720 may be an independent device independent of the processor 710 and may also be integrated into the processor 710.

Optionally, as shown in FIG. 7, the communication device 700 may further include a transceiver 730, and the processor 710 may control the transceiver 730 to communicate with another device, specifically sending information or data to another device or receiving information or data from another device.

The transceiver 730 may include a transmitter and a receiver. The transceiver 730 may further include antennae, and the number of the antennae may be one or more.

Optionally, the communication device 700 may specifically be the network device of the embodiments of the disclosure. The communication device 70 may implement corresponding flows implemented by the network device in each method of the embodiments of the disclosure. For simplicity, elaborations are omitted herein.

Optionally, the communication device 700 may specifically be a terminal device or network device of the embodiment of the disclosure. The communication device 700 may implement corresponding flows implemented by the mobile terminal/terminal device in each method of the embodiments of the disclosure. For simplicity, elaborations are omitted herein.

Figure 8:
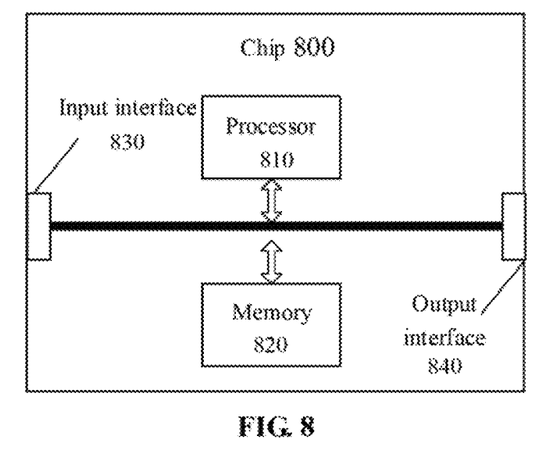
FIG. 8 is a schematic block diagram of a chip according to an embodiment of the disclosure.

FIG. 8 is a schematic structure diagram of a chip according to another embodiment of the disclosure. The chip 800 shown in FIG. 8 includes a processor 810, and the processor 810 may call and run a computer program in a memory to implement the method in the embodiments of the disclosure.

Optionally, as shown in FIG. 8, the chip 800 may further include the memory 820. The processor 810 may call and run the computer program in the memory 820 to implement the method in the embodiments of the disclosure.

The memory 820 may be an independent device independent of the processor 810 or may also be integrated into the processor 810.

Optionally, the chip 800 may further include an input interface 830. The processor 810 may control the input interface 830 to communicate with another device or chip, specifically acquiring information or data sent by the another device or chip.

Optionally, the chip 800 may further include an output interface 840. The processor 810 may control the output interface 840 to communicate with the other device or chip, specifically outputting information or data sent by the other device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the terminal device of the embodiments of the disclosure, and the chip may implement corresponding flows implemented by the terminal device in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 9:
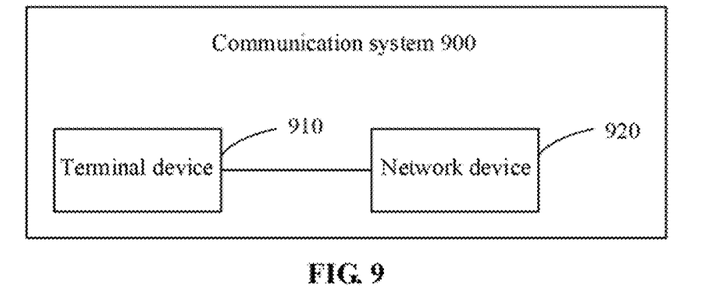
FIG. 9 is a third schematic diagram of an architecture of a communication system according to an embodiment of the disclosure.

FIG. 9 is a second block diagram of a communication system 900 according to an embodiment of the disclosure. As shown in FIG. 9, a communication system 900 includes a terminal device 910 and a network device 920.

The terminal device 910 may be configured to realize corresponding functions realized by the terminal device in the method, and the network device 920 may be configured to realize corresponding functions realized by the network device in the method. For simplicity, elaborations are omitted herein.

It is to be understood that the processor in the embodiment of the disclosure may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure. The computer program can cause a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program can cause a computer to execute corresponding flows implemented by the terminal device in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction can cause a computer to execute corresponding flows implemented by the network device in each method of the embodiments of the disclosure. For simplicity, elaborations are omitted herein.

Optionally, the computer program product may be applied to a mobile terminal/terminal device in the embodiments of the disclosure, and the computer program instruction can cause the computer to execute corresponding flows implemented by the mobile terminal/terminal device in each method of the embodiments of the disclosure. For simplicity, elaborations are omitted herein.

The embodiments of the disclosure also provide a computer program.

Optionally, the computer program may be applied to a network device in the embodiments of the disclosure, and the computer program can run in a computer to cause the computer to execute corresponding flows implemented by the network device in each method of the embodiments of the disclosure. For simplicity, elaborations are omitted herein.

Optionally, the computer program may be applied to a mobile terminal/terminal device in the embodiments of the disclosure, and the computer program can run in the computer to cause the computer to execute corresponding flows implemented by the mobile terminal/terminal device in each method of the embodiments of the disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product. The computer software product may be stored in a storage medium, including a plurality of instructions configured to cause a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

According to the technical solutions of the embodiments of the disclosure, when a terminal device transmits data through a channel, the data may be transmitted based on the selected basic parameter set. In such a manner, the problem of how to select a basic parameter set to send and receive data under the condition that there are multiple basic parameter sets is solved, so that the intersection efficiency of a terminal is ensured.

The above is only the specific implementation mode of the disclosure and not intended to limit the scope of protection of the disclosure. Any variations or replacements apparent to those skilled in the art within the technical scope disclosed by the application shall fall within the scope of protection of the disclosure. Therefore, the scope of protection of the disclosure shall be subject to the scope of protection of the claims.

The invention claimed is:

1. A method for data transmission, performed by a terminal device, the method comprising:
   determining a basic parameter set among at least one basic parameter set adopted for a first sidelink (SL) channel according to a corresponding relationship between at least one resource pool and the at least one basic parameter set such that different resource pools correspond to different basic parameter sets,
   wherein when the first SL channel is transmitted on a first carrier that is configured to transmit uplink data, the basic parameter set adopted for the first SL channel is the same as that for the uplink data, such that a cyclic prefix (CP) length in the basic parameter set for the first SL channel is the same as that for the uplink data; and
   performing data transmission on the first SL channel based on the -basic parameter set.

2. A terminal device, comprising:
   a processor, configured to: determine a basic parameter set among at least one basic parameter set adopted for a first sidelink (SL) channel according to a corresponding relationship between at least one resource pool and the at least one basic parameter set such that different resource pools correspond to different basic parameter sets, wherein when the first SL channel is transmitted on a first carrier that is configured to transmit uplink data. the basic parameter set adopted for the first SL channel is the same as that for the uplink data, such that a cyclic prefix (CP) length in the basic parameter set for the first SL channel is the same as that for the uplink data; and a transceiver, configured to perform data transmission on the first SL channel based on the basic parameter set.

3. A network device, comprising:

a processor, configured to determine configuration information, the configuration information being configured for a terminal device to determine a basic parameter set among at least one basic parameter set adopted for a first sidelink (SL) channel according to a corresponding relationship between at least one resource pool and the at least one basic parameter set such that different resource pools correspond to different basic parameter sets, wherein when the first SL channel is transmitted on a first carrier that is configured to transmit uplink data, the basic parameter set adopted for the first SL channel is the same as that for the uplink data, such that a cyclic prefix (CP) length in the basic parameter set for the first SL channel is the same as that for the uplink data; and a transceiver, configured to send the configuration information to the terminal device.

4. The network device of claim 3, wherein the first SL channel is a physical sidelink shared channel (PSSCH), or a physical sidelink control channel (PSCCH) or a physical sidelink broadcast channel (PSBCH).

5. The network device of claim 3, wherein the transceiver is configured to send indication information to the terminal device through a second channel.

6. The network device of claim 5, wherein the second channel comprises first indication information, and the first indication information is configured to indicate the basic parameter set adopted for the first SL channel.

* * * * *